United States Patent
Mizuno

(10) Patent No.: US 11,359,535 B2
(45) Date of Patent: Jun. 14, 2022

(54) EXHAUST GAS TREATMENT SYSTEM

(71) Applicant: Jissen Kankyo Kenkyusho Co., Ltd., Nagoya (JP)

(72) Inventor: Hisashi Mizuno, Nagoya (JP)

(73) Assignee: JISSEN KANKYO KENKYUSHO CO., LTD., Nagoya (JP)

( * ) Notice: Subject to any disclaimer, the term of this patent is extended or adjusted under 35 U.S.C. 154(b) by 303 days.

(21) Appl. No.: 16/620,648

(22) PCT Filed: Jun. 13, 2018

(86) PCT No.: PCT/JP2018/022534
§ 371 (c)(1),
(2) Date: Jul. 31, 2020

(87) PCT Pub. No.: WO2018/230593
PCT Pub. Date: Dec. 20, 2018

(65) Prior Publication Data
US 2020/0391155 A1      Dec. 17, 2020

(30) Foreign Application Priority Data

Jun. 13, 2017   (JP) .............................. JP2017-115747

(51) Int. Cl.
*F01N 13/00*     (2010.01)
*B01D 53/40*     (2006.01)
(Continued)

(52) U.S. Cl.
CPC ............. *F01N 13/00* (2013.01); *B01D 53/40* (2013.01); *F01N 3/0821* (2013.01);
(Continued)

(58) Field of Classification Search
CPC . F01N 1/084; F01N 1/12; F01N 3/027; F01N 3/2013; F01N 2240/16; F01N 2470/24; F01N 2490/06; F01N 2550/22
See application file for complete search history.

(56) References Cited

U.S. PATENT DOCUMENTS

| | | | |
|---|---|---|---|
| 4,688,495 | A | 8/1987 | Galloway |
| 2015/0232333 | A1 | 8/2015 | Seiwert et al. |
| 2016/0115025 | A1 | 4/2016 | Seiwert et al. |

FOREIGN PATENT DOCUMENTS

| | | |
|---|---|---|
| JP | 200055338 A | 2/2000 |
| JP | 2002336653 A | 11/2002 |

(Continued)

OTHER PUBLICATIONS

Machine translation of JP2015196133A, accessed Dec. 10, 2021. (Year: 2021).*

(Continued)

*Primary Examiner* — Jonathan R Matthias
(74) *Attorney, Agent, or Firm* — Abelman, Frayne & Schwab; Stefan Knirr

(57) ABSTRACT

An exhaust gas treatment system capable of purifying exhaust gas containing moisture includes superheated steam generating pipes (20, 40) and a housing (10). The superheated steam generating pipe (20, 40) is formed of a material capable of generating heat by energization, and has a flow path (200, 400) through which exhaust gas can flow, and moisture contained in the exhaust gas flowing through the flow path is converted into superheated steam by the heat. The housing (10) is provided to accommodate the superheated steam generating pipe, is formed to allow the exhaust gas before being introduced into the flow path to flow therethrough and can preheat the exhaust gas by the heat of the superheated steam generating pipe.

8 Claims, 6 Drawing Sheets

(51) Int. Cl.
  *F01N 3/08* (2006.01)
  *B01D 53/56* (2006.01)
  *F01N 3/18* (2006.01)

(52) U.S. Cl.
  CPC .......... *B01D 53/565* (2013.01); *F01N 3/0828* (2013.01); *F01N 3/18* (2013.01); *F01N 2240/02* (2013.01); *F01N 2240/16* (2013.01); *F01N 2470/24* (2013.01); *F01N 2590/02* (2013.01)

(56) References Cited

FOREIGN PATENT DOCUMENTS

| | | |
|---|---|---|
| JP | 2005337509 A | 12/2005 |
| JP | 2007105603 A | 4/2007 |
| JP | 2015196133 A | 11/2015 |
| JP | 2017512123 A | 5/2017 |
| WO | 2015123578 A1 | 8/2015 |

OTHER PUBLICATIONS

Machine translation of JP2000055338A, accessed Dec. 10, 2021. (Year: 2021).*
Machine translation of JP2005337509A, accessed Dec. 10, 2021. (Year: 2021).*
PCT ISA and Written Opinion PCT/JP2018/022534, dated Aug. 28, 2018, (9 pages) (English translation attached 12 pages).

* cited by examiner

EXHAUST GAS TREATMENT SYSTEM

CROSS-REFERENCE TO RELATED APPLICATIONS

This application is a United States National Phase Application Under 35 USC § 371 of PCT/JP2018/022534 filed on Jun. 13, 2018, and claims the benefit under 35 USC § 119 of Japanese Patent Application No. 2017-115747, filed Jun. 13, 2017, the disclosures of which are incorporated herein by reference in their entireties.

TECHNICAL FIELD

The present disclosure relates to an exhaust gas treatment system.

BACKGROUND OF THE INVENTION

Conventionally, there has been known an exhaust gas treatment system for purifying exhaust gas by removing environmental pollutants contained in exhaust gas discharged by combustion of fuel, incineration treatment of municipal garbage, and thermal decomposition treatment of organic matter in an engine of an automobile, a ship, or the like. Since environmental pollutants are plural, such as sulfur compounds and dioxins derived from components are contained in the substance to be treated, and nitrogen oxides derived from components are contained in the air, it is necessary to perform treatment corresponding to the respective substances in the purification of the exhaust gas. Therefore, the configuration of the exhaust gas treatment system becomes relatively complicated. For example, Patent Document 1 discloses an exhaust gas treatment system that includes a plasma generation unit capable of generating low-temperature plasma and a catalyst and purifies an exhaust gas containing dioxin or nitrogen oxides by a combination of the low-temperature plasma and the catalyst.

PRIOR ART LITERATURE

Patent Document

[Patent Document 1] Japanese Patent Application No. 2002-336653

SUMMARY OF THE INVENTION

However, in the exhaust gas treatment system described in Patent Document 1, there is a fear that the purification capacity may be lowered due to the deterioration of the catalyst.

The present disclosure has been made in view of the above-mentioned problems, and an object thereof is to provide an exhaust gas treatment system having a simple configuration capable of efficiently removing environmental pollutants from exhaust gas.

According to the present disclosure, an exhaust gas treatment system capable of purifying exhaust gas containing moisture includes a superheated steam pipe and a housing.

The superheated steam generating pipe is formed of a material capable of generating heat by energization and has a flow path through which exhaust gas can flow. In the superheated steam generating pipe, moisture contained in the exhaust gas flowing through the flow path by heat is used as superheated steam.

The housing is provided to accommodate the superheated steam generating pipe and is formed to allow the exhaust gas before being introduced into the flow path to flow therethrough. The housing can preheat the exhaust gas by the heat of the superheated steam generator.

In the exhaust gas treatment system of the present disclosure, the exhaust gas before being introduced into the flow path flows around the superheated steam generating pipe in the housing. At this time, the exhaust gas is preheated by the heat discharged from the superheated steam generating pipe. When the preheated exhaust gas flows into the flow path of the superheated steam generating pipe, the exhaust gas is further heated by the heat of the superheated steam generating pipe, and superheated steam is generated in the exhaust gas. When superheated steam is generated, the dissolved oxygen contained in the moisture in the exhaust gas is diluted by the expansion of the volume, so that the flow path becomes a reducing atmosphere at a high temperature. As a result, dioxin and nitrogen oxides contained in the exhaust gas can be reduced and decomposed.

As described above, in the exhaust gas treatment system of the present disclosure, the exhaust gas before being introduced into the flow path is preheated by the heat discharged to the outside by the superheated steam generating pipe, and the flow path is made to be a reducing atmosphere of high temperature by the superheated steam, and dioxin and nitrogen oxides are reduced and decomposed. As a result, the exhaust gas treatment system of the present disclosure can remove a plurality of types of environmental pollutants from the exhaust gas with a simple configuration without using a catalyst or an additive.

BRIEF DESCRIPTION OF THE DRAWINGS

These and other objects, features and advantages of the present disclosure will become more apparent from the following detailed description taken in conjunction with the accompanying drawings. In the drawing.

DETAILED DESCRIPTION OF THE INVENTION

Figure 1:
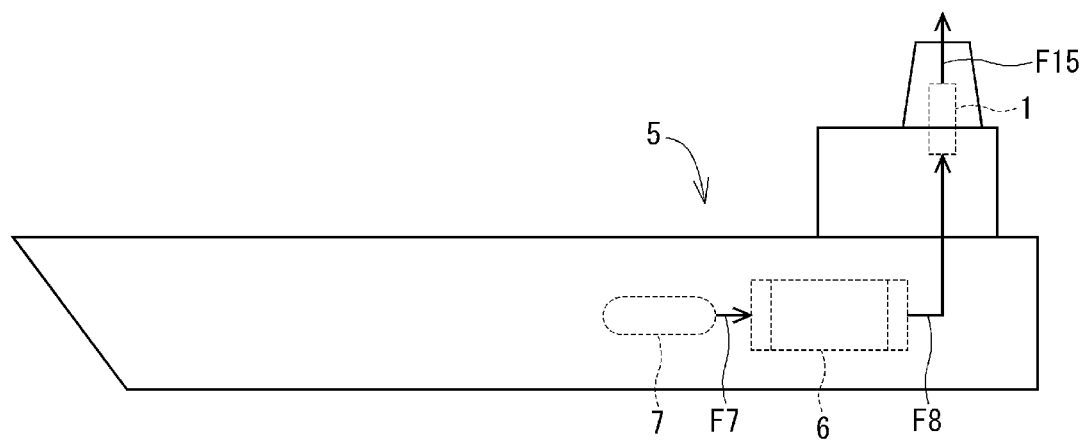
FIG. 1 is a schematic diagram of a tanker to which the exhaust gas treatment system according to the first embodiment is applied.

Hereinafter, a plurality of embodiments will be described with reference to the drawings. In the plurality of embodiments, substantially the same components are denoted by the same reference numerals, and description thereof is omitted.

First Embodiment

The exhaust gas treatment system according to the first embodiment will be described with reference to FIGS. 1 to 3. The exhaust gas treatment system 1 according to the first embodiment is applied to a tanker. FIG. 1 is a schematic diagram of a tanker 5 to which an exhaust gas treatment system 1 is applied. The engine 6 of the tanker 5 combusts the heavy oil (solid line arrow F7 in FIG. 1) sent from the fuel tank 7 and generates the propulsive force of the tanker 5. The exhaust gas generated by the combustion of the heavy oil in the engine 6 (solid arrow F8 in FIG. 1) is discharged to the outside of the tanker 5 after the environmental pollutants are removed in the exhaust gas treatment system 1. At this time, the exhaust gas F8 contains moisture in addition to environmental pollutants such as dioxins, nitrogen oxides, sulfur oxides, and acid fumes generated by the combustion of heavy oil.

The exhaust gas treatment system 1 includes a housing 10, a superheated steam generating pipe 20, a power supply unit 25, and a filter section 30. The exhaust gas treatment system 1 can remove a plurality of types of environmental pollutants contained in the exhaust gas F8.

The housing 10 is a member made of metal and formed in a hollow shape. The housing 10 has an accommodation space 100 and an inlet 101.

The accommodation space 100 is formed to be able to accommodate a part of the superheated steam generating pipe 20.

The inlet 101 is formed in an outer wall of the housing 10 and can communicate the accommodation space 100 with the outside of the housing 10. The introduction port 101 is provided with an introduction pipe 11 through which the exhaust gas F8 can be introduced into the accommodation space 100.

An insulating material 12 is provided on the outer wall of the housing 10.

The superheated steam generating pipe 20 is a cylindrical member formed so that one end is accommodated in the accommodation space 100 and the other end protrudes from the housing 10. As shown in FIG. 3, the superheated steam generating pipe 20 has a cylindrical portion 21 and a plurality of projecting portions 221, 222, 223, and 224. The cylindrical portion 21 and the projecting portions 221, 222, 223, 224 are integrally formed of a metal based on nickel of 70%-chromium of 25%, which is a material capable of generating heat by energization, for example, Inconel® or Hastelloy®.

Figure 3:
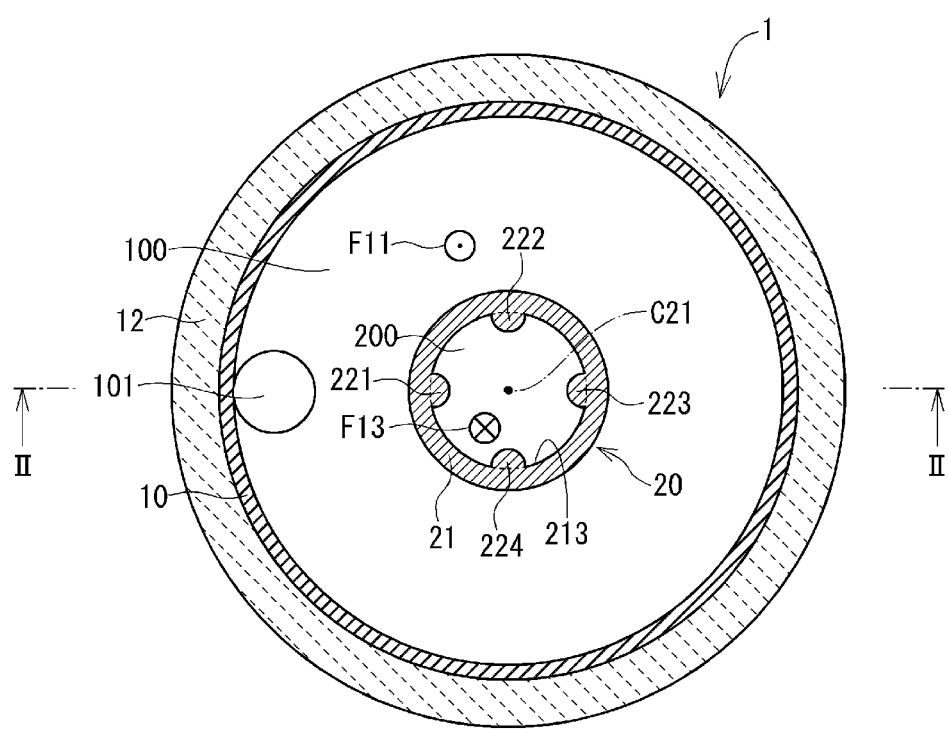
FIG. 3 is a cross-sectional view taken along the line of FIG. 2.

As shown in FIG. 3, the cylindrical portion 21 is formed so that the cross-sectional shape perpendicular to the flow direction of the exhaust gas F13 is annular. The cylindrical portion 21 has an exhaust gas inlet 211 and an exhaust gas outlet 212. The exhaust gas inlet 211 is formed at one end located in the accommodation space 100 on the opposite side of the housing 10 from the side where the inlet 101 is formed. The exhaust gas outlet 212 is formed at the other end of the cylindrical portion 21 protruding from the side of the housing 10 where the inlet 101 is formed to the outside of the housing 10. The cylindrical portion 21 is electrically connected to the power supply portion 25.

The projecting portions 221, 222, 223, and 224 are provided on the inner wall surface 213 of the cylindrical portion 21. The projecting portions 221, 222, 223, and 224 are formed to project radially inward of the cylindrical portion 21 from the inner wall surface 213. In the first embodiment, as shown in FIG. 3, the projecting portions 221, 222, 223, and 224 are provided at equal intervals as viewed from the central axis C21 of the cylindrical portion 21.

Figure 2:
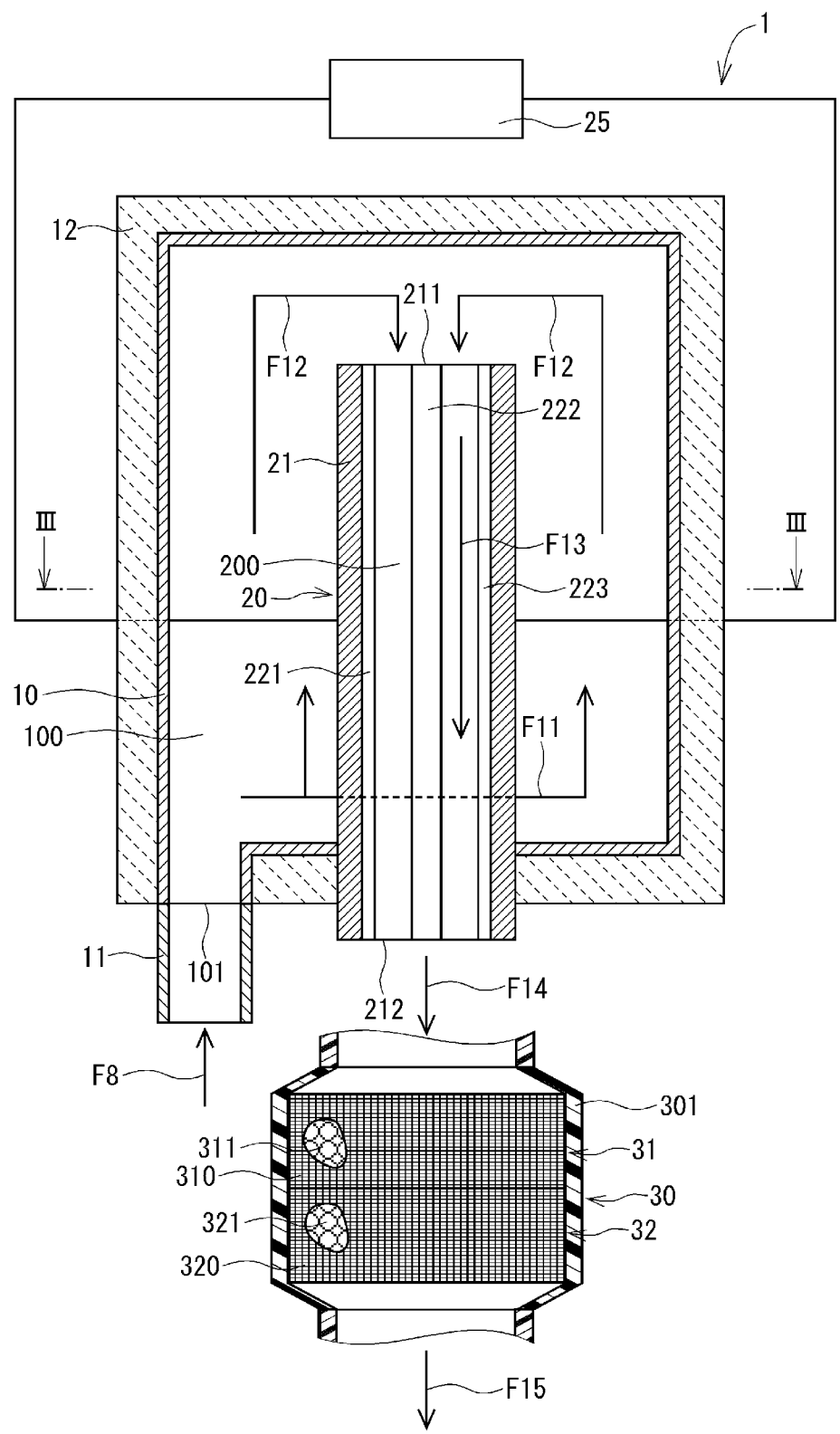
FIG. 2 is a schematic diagram of an exhaust gas treatment system according to the first embodiment.

The cylindrical portion 21 and the projecting portions 221, 222, 223, 224 form a flow path 200 through which the exhaust gas flows as indicated by the solid arrow F13 in FIG. 2.

The power supply unit 25 is provided to be able to control the power supplied to the cylindrical portion 21 and the projecting portions 221, 222, 223, 224. When the power supply unit 25 supplies electric power, the cylindrical portion 21 and the projecting portions 221, 222, 223, 224 generate heat.

The filter section 30 is located downstream of the superheated steam generating pipe 20 in the flow of the exhaust gas of the exhaust gas treatment system 1. The filter section 30 includes a filter casing 301, a first filter 31, and a second filter 32.

The filter casing 301 has a hollow shape and accommodates the first filter 31 and the second filter 32.

The first filter 31 is provided on the upstream side in the filter casing 301 to prevent the flow of the primary treated exhaust gas F14 discharged from the exhaust gas outlet 212 of the superheated steam generating pipe 20 in the filter casing 301. The first filter 31 accommodates granular activated carbon 311 inside a mesh 310 that forms the outer contour of the first filter 31.

The activated carbon 311 is formed from Jatropha seed slag, has a pore diameter in the range of 0.5 to 1.0 nm, and has a peak at 0.6 nm in the differential pore diameter distribution. The activated carbon 311 has characteristics in which the difference between the mass of moisture adsorbed per 1 g of activated carbon at a relative water vapor pressure of 0.05 and the mass of moisture adsorbed per 1 g of activated carbon at a relative water vapor pressure of 0.45 is 130 mg or more, and the difference between the mass of moisture adsorbed per 1 g of activated carbon at a relative water vapor pressure of 0.25 and the mass of moisture adsorbed per 1 g of activated carbon at a relative water vapor pressure of 0.45 is 101.4 mg or more. The activated carbon 311 has a characteristic in which the water vapor adsorption isotherm at a relative water vapor pressure of 0.05 to 0.45 is curved downward.

The second filter 32 is formed in a columnar shape and is provided on the downstream side in the filter casing 301 to prevent the flow of the fluid flowing in the filter casing 301. The second filter 32 accommodates the granular apatite 321 inside the mesh 320 which is the outer contour of the second filter 32.

Apatite 321 is hydroxyapatite and has a hydroxyl group. The apatite 321 is formed by a known method, for example, by reacting calcium ions and phosphate ions in a neutral or alkaline aqueous solution at room temperature. In the first embodiment, the second filter 32 is filled with particles of apatite 321 having a diameter of 2.5 mm inside the mesh 320, but the particle diameter of the apatite 321 is not limited to this.

Next, the operation of the exhaust gas treatment system 1 will be described with reference to FIGS. 2 and 3.

When the exhaust gas F8 of the engine 6 flows into the accommodation space 100 via the introducing pipe 11, the exhaust gas in the housing 10 flows around the superheated steam generating pipe 20 from the side where the introducing port 101 is formed to the side where the introducing port 101 is formed, as shown by solid line arrows F11 and F12 in FIG. 2. At this time, the exhaust gases F11 and F12 flowing around the superheated steam generating pipe 20 are preheated by the heat discharged to the outside by the superheated steam generating pipe 20. The exhaust gas preheated in the accommodation space 100 flows into the flow path 200 via the exhaust gas inlet 211 of the superheated steam generating pipe 20.

The exhaust gas F13 flowing through the flow path 200 is further heated by the superheated steam generating pipe 20, and moisture contained in the exhaust gas F13 becomes superheated steam. As a result, the dissolved oxygen contained in the moisture in the exhaust gas is diluted by the expansion of the volume, so that the flow path 200 becomes a reducing atmosphere at a high temperature, and dioxin and nitrogen oxides contained in the exhaust gas F13 are reduced and decomposed. The exhaust gas flowing through the flow path 200 is discharged from the exhaust gas outlet 212 toward the filter section 30.

The primary treatment exhaust gas F14 from which dioxin and nitrogen oxides have been removed flows into the filter section 30. In the filter section 30, the activated carbon 311 included in the first filter 31 adsorbs a sulfur compound gas as a "predetermined gas" included in the exhaust gas. The apatite 321 included in the second filter 32 absorbs acid fume, which is water vapor exhibiting acidity. The secondary processing exhaust gas F15 that has passed through the filter section 30 is discharged to the outside of the tanker 5.

(a) In the exhaust gas treatment system 1 according to the first embodiment, the exhaust gas before being introduced into the flow path 200 flows around the superheated steam generating pipe 20 in the housing 10. At this time, the exhaust gas is preheated by the heat discharged to the outside by the superheated steam generating pipe 20. When the preheated exhaust gas flows into the flow path 200 of the superheated steam generating pipe 20, the exhaust gas is further heated by the heat of the superheated steam generating pipe 20, and superheated steam is generated in the exhaust gas. When the superheated steam is generated, the dissolved oxygen contained in the moisture of the exhaust gas is diluted by the expansion of the volume, and the flow path 200 becomes a reducing atmosphere at a high temperature. As a result, dioxin and nitrogen oxides contained in the exhaust gas can be reduced and decomposed.

As described above, the exhaust gas treatment system 1 preheats the exhaust gas before being introduced into the flow path 200 by the heat discharged from the superheated steam generating pipe 20, and reductively decomposes dioxin and nitrogen oxides by using the superheated steam as a reducing atmosphere at a high temperature in the flow path 200. As a result, the exhaust gas treatment system 1 can remove dioxin and nitrogen oxides from the exhaust gas with a simple configuration without using a catalyst or an additive.

(b) The superheated steam generating pipe 20 has a plurality of projecting portions 221, 222, 223, and 224 on the inner wall surface 213 of the cylindrical portion 21. As a result, the area in which the exhaust gas F13 flowing through the flow path 200 contacts with the cylindrical portion 21 and the projecting portions 221, 222, 223, 224 can be made relatively large. Therefore, in the exhaust gas treatment system 1, since the flow path 200 can be made to be a reducing atmosphere with relatively little energy, dioxin and nitrogen oxides can be efficiently reduced and decomposed.

(c) In the exhaust gas treatment system 1, the sulfur compound gas and the acid fume contained in the primary treatment exhaust gas F14 from which dioxin and nitrogen oxides have been removed are recovered in the filter section 30. As a result, the exhaust gas treatment system 1 can reliably remove the sulfur compound gas and the acid fume from the exhaust gas and can further purify the exhaust gas discharged to the outside of the tanker 5.

Second Embodiment

An exhaust gas treatment system according to the second embodiment will be described with reference to FIGS. 4 and 5. The second embodiment is different from the first embodiment in that the shape of the superheated steam generating pipe and the heat receiving portion are provided.

The exhaust gas treatment system 2 according to the second embodiment includes a housing 10, a superheated steam generating pipe 40, a power supply unit 25, a heat receiving unit 50, and a filter section 30. The exhaust gas treatment system 2 can remove a plurality of types of environmental pollutants contained in the exhaust gas F8.

The superheated steam generating pipe 40 is a pipe which is partially accommodated in the accommodation space 100 and is formed so that an end portion thereof protrudes from the housing 10. As shown in FIG. 4, the superheated steam generating pipe 40 has a spiral shape. The superheated steam generating pipe 40 is integrally formed of a metal based on 70% nickel-25% chromium, which is a material capable of generating heat by energization, for example, Inconel® or Hastelloy®. The superheated steam generating pipe 40 is electrically connected to the power supply unit 25.

The superheated steam generating pipe 40 has an exhaust gas inlet 411, an exhaust gas outlet 412, and a flow path 400.

The exhaust gas inlet 411 is formed at the end of the superheated steam generating pipe 40 on the side where the inlet 101 is formed in the accommodation space 100.

The exhaust gas outlet 412 is formed at an end portion of the housing 10 projecting outward from the side opposite to the side where the inlet 101 of the housing 10 is formed.

The flow path 400 communicates the exhaust gas inlet 411 with the exhaust gas outlet 412. The flow path 400 is formed in a spiral shape.

The heat receiving portion 50 is provided to surround the superheated steam generating pipe 40. In the second embodiment, the heat receiving portion 50 is a substantially cylindrical member provided in the radially outward direction of the spiral superheated steam generating pipe 40. The heat receiving portion 50 is formed of a material capable of increasing the temperature of the superheated steam generating pipe 40 by receiving heat discharged outward. One end 501 of the heat receiving portion 50 is provided on the inner wall surface 102 of the wall body in which the inlet 101 of the housing 10 is formed. The other end 502 of the heat receiving portion 50 has an opening 503.

Next, the operation of the exhaust gas treatment system 2 will be described with reference to FIGS. 4 and 5.

Figure 4:
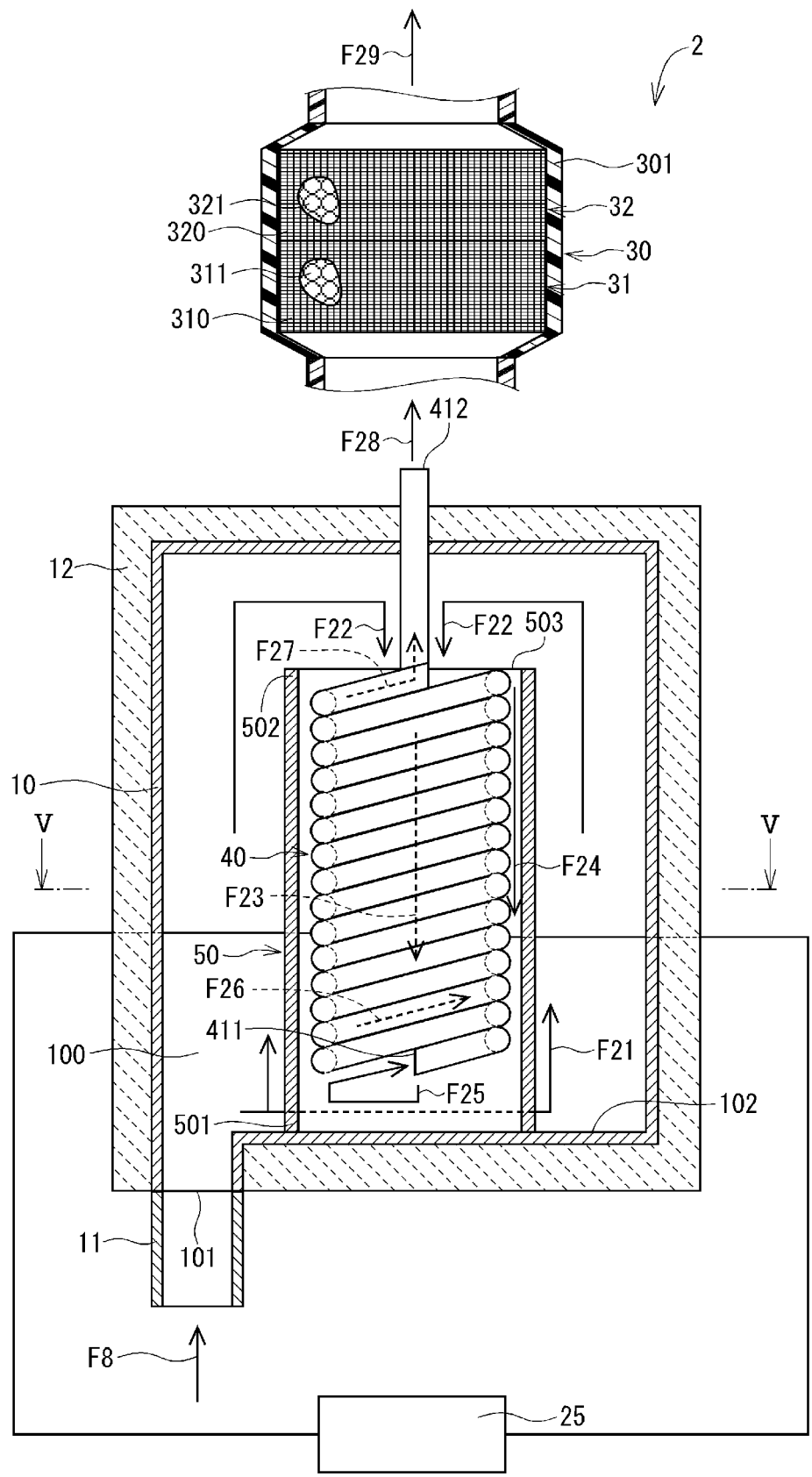
FIG. 4 is a schematic diagram of an exhaust gas treatment system according to the second embodiment.
Figure 5:
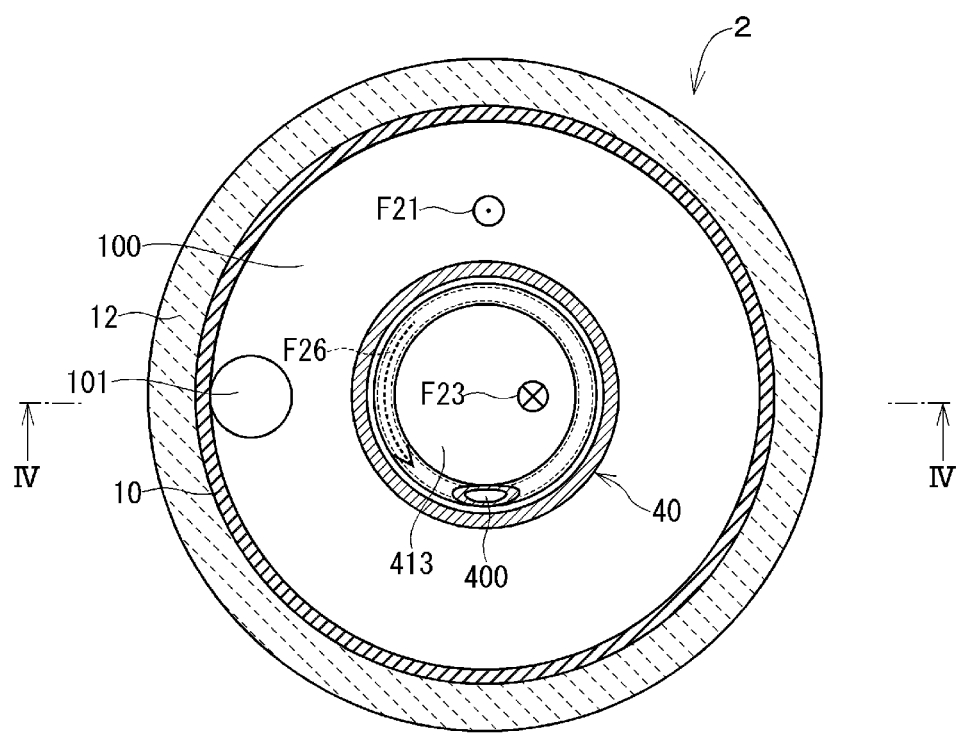
FIG. 5 is a cross-sectional view taken along line V-V of FIG. 4.

When the exhaust gas F8 of the engine 6 flows into the accommodation space 100 via the introducing pipe 11, the exhaust gas in the housing 10 flows in the radially outward direction of the heat receiving portion 50 from the side where the introducing port 101 is formed to the side where the introducing port 101 is formed, as shown by solid line arrows F21 and F22 in FIG. 4. At this time, the exhaust gas flowing in the radially outward direction of the heat receiving section 50 is primary preheated by the heat receiving section 50 which is heated by the heat emitted outward from the superheated steam generating pipe 40. The exhaust gas which has been primary preheated in the accommodation space 100 flows into the heat receiving portion 50 through the opening 503.

The exhaust gas flowing in the heat receiving portion 50 passes through the space 413 inside the spiral superheated steam generating pipe 40 (see FIG. 5) or the space between the superheated steam generating pipe 40 and the heat receiving portion 50, as indicated by solid line arrows F23 and F24 in FIG. 4, and is directed toward the one end portion 501 side of the heat receiving portion 50. At this time, the exhaust gas passing through the space 413 or the space between the superheated steam generating pipe 40 and the heat receiving portion 50 is secondary preheated. The exhaust gas reaching the vicinity of one end 501 of the heat receiving section 50 flows into the flow path 400 via the exhaust gas inlet 411 of the superheated steam generating pipe 40, as indicated by the solid arrow F25 in FIG. 4.

The exhaust gas F26 flowing through the flow path 400 flows along the shape of the flow path 400 formed in a spiral shape. At this time, the exhaust gas F26 is further heated by the superheated steam generating pipe 40, and the moisture contained in the exhaust gas F26 becomes superheated steam. As a result, since the flow path 400 becomes a reducing atmosphere at a high temperature, dioxin and nitrogen oxides contained in the exhaust gas F26 are reduced and decomposed. After flowing through the spiral flow path 400, the exhaust gas F27 is discharged from the exhaust gas outlet 412 toward the filter section 30.

The primary treatment exhaust gas F28 discharged from the exhaust gas outlet 412 flows into the filter section 30. In the filter section 30, similarly to the first embodiment, the sulfur compound gas contained in the primary treatment exhaust gas F28 is adsorbed by the activated carbon 311, and the acid fume contained in the primary treatment exhaust gas F28 is absorbed by the apatite 321. The secondary processing exhaust gas F29 having passed through the filter section 30 is discharged to the outside of the tanker 5.

In the exhaust gas treatment system 2 according to the second embodiment, superheated steam is generated by the superheated steam generating pipe 40 in the exhaust gas after preheating in the housing 10. Thus, the second embodiment exhibits the effects (a) and (c) of the first embodiment.

In the exhaust gas treatment system 2, a part of the exhaust gas immediately before flowing through the flow path 400 flows through the space 413 inside the spiral superheated steam generating pipe 40. Since the space 413 is surrounded by the superheated steam generating pipe 40, the temperature of the exhaust gas flowing through the space 413 easily rises. This makes it possible to preheat the exhaust gas efficiently.

In addition, since the exhaust gas F26 flowing through the flow path 400 of the superheated steam generating pipe 40 formed in a spiral shape is heated by the superheated steam generating pipe 40 for a relatively long time, the moisture contained in the exhaust gas F26 tends to become superheated steam. Therefore, since the flow path 400 can be reliably set to a high-temperature reducing atmosphere, dioxin and nitrogen oxides contained in the exhaust gas can be reliably reduced.

The exhaust gas treatment system 2 includes a heat receiving portion 50 provided in a radially outward direction of the spiral superheated steam generating pipe 40. The heat receiving portion 50 receives heat discharged toward the outside of the superheated steam generating pipe 40 to become relatively high temperature, and partitions the accommodation space 100 into flows of the exhaust gases F21 and F22 flowing from the side of the inlet 101 to the side of the inlet 101, and flows of the exhaust gases F23 and F24 flowing from the side of the inlet 101 to the side of the inlet 101. As a result, the residence time of the exhaust gas in the housing 10 becomes relatively long, and the primary preheating and the secondary preheating are performed by the heat receiving section 50, so that the exhaust gas can be sufficiently preheated. Therefore, superheated steam is easily generated in the flow path 400, so that the flow path 400 can be reliably set to a high-temperature reducing atmosphere and dioxin and nitrogen oxides contained in the exhaust gas can be reliably reduced.

Third Embodiment

An exhaust gas treatment system according to a third embodiment will be described with reference to FIG. 6. In the third embodiment, the field to which the exhaust gas treatment system is applied is different from that of the first embodiment.

Figure 6:
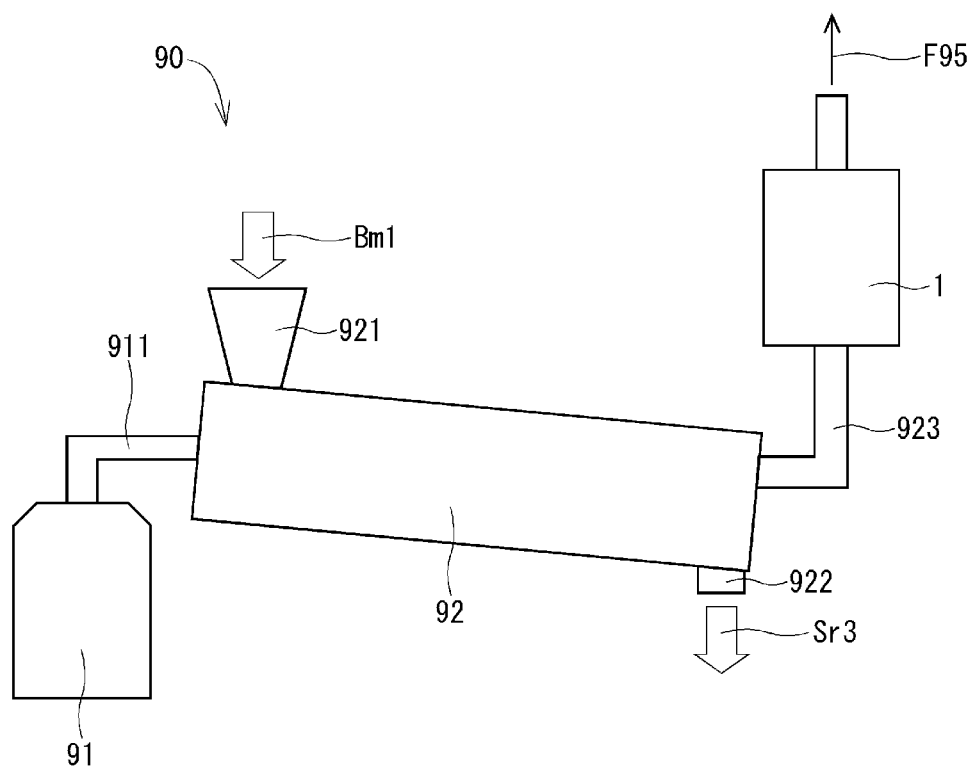
FIG. 6 is a schematic diagram of a pyrolysis system to which the exhaust gas treatment system according to the third embodiment is applied.

FIG. 6 is a schematic diagram of a thermal decomposition system 90 to which the exhaust gas treatment system 1 is applied. The thermal decomposition system 90 includes a heat source generating furnace 91, a thermal decomposition furnace 92, and an exhaust gas treatment system 1.

The heat source generating furnace 91 generates a heat source capable of heating, for example, biomass to be subjected to thermal decomposition in the thermal decomposition furnace 92. The heat source generating furnace 91 of the third embodiment generates a relatively high-temperature gas by, for example, burning a fuel. The pyrolysis system 90 performs pyrolysis of the biomass using this hot gas as a "heat source". The high-temperature gas generated in the heat source generation furnace 91 is introduced into the pyrolysis furnace 92 through a pipe 911.

The pyrolysis furnace 92 is, for example, a rotary kiln, and heats the biomass Bm1 input from the input port 921 provided in the pyrolysis furnace 92 in a reducing atmosphere. Since the pyrolysis furnace 92 is rotated by a drive unit (not shown), the biomass in the pyrolysis furnace 92 is heated by the rotation and moves from the end on the side where the inlet 921 is provided to the end on the side where the outlet 922 is provided. The thermal decomposition treatment of the biomass in the thermal decomposition furnace 92 generates a fluid containing an organic compound as a main component, a residue of a solid containing carbon as a main component, environmental pollutants, moisture, and the like. Of these, a substance having a relatively small density is introduced into the exhaust gas treatment system 1 as "exhaust gas" through the pipe 923. Residues of relatively dense materials, e.g., solids, are discharged from the outlet 922 to the outside of the pyrolysis system 90, as indicated by the open arrow Sr3 in FIG. 6.

The exhaust gas introduced into the exhaust gas treatment system 1 is preheated in the accommodation space 100 of the exhaust gas treatment system 1 and flows into the flow path 200 of the superheated steam generating pipe 20. Since the exhaust gas flowing into the flow path 200 is further heated to generate superheated steam, environmental pollutants are reduced and decomposed. Further, tar derived from biomass, which is one of fluids containing an organic compound as a main component, is decomposed into a combustible gas in a reducing atmosphere of 850 degrees or more, for example. As a result, the gas discharged from the exhaust gas outlet 212 of the superheated steam generating pipe 20 contains a relatively large amount of combustible gas.

The gas discharged from the superheated steam generating pipe 20 is introduced into the filter section 30. In the filter section 30, sulfur compound gas and acid fumes contained in the exhaust gas are absorbed. The gas F95 discharged from the filter section 30 is discharged to the outside of the pyrolysis system 90. The gas F95 discharged to the outside of the pyrolysis system 90 is stored or used for power generation.

The exhaust gas treatment system 1 according to the third embodiment is applied to a thermal decomposition system 90 of biomass. At this time, the exhaust gas treatment system 1 removes environmental pollutants contained in the exhaust gas discharged from the pyrolysis furnace 92. Therefore, the third embodiment exhibits the effects (a) to (c) of the first embodiment.

In the exhaust gas treatment system 1 according to the third embodiment, the temperature of the exhaust gas can be raised to a relatively high temperature by the preliminary heating in the accommodation space 100 and the heating in the superheated steam generating pipe 20. As a result, organic compounds such as tar generated by the thermal decomposition treatment of the biomass, which are relatively difficult to decompose, can be decomposed into combustible gases. Therefore, in the third embodiment, the combustible gas can be efficiently generated in the thermal decomposition treatment.

OTHER EMBODIMENTS

In the first and second embodiments, the exhaust gas treatment system is used for purifying the exhaust gas of a tanker. In the third embodiment, the exhaust gas generated by the thermal decomposition treatment of the biomass is used for the treatment. However, the situation in which the exhaust gas treatment system is applied is not limited to this. Exhaust gas generated by combustion of fuel in an engine of an automobile, incineration treatment of municipal garbage, heat treatment of an organic compound, or the like, and may be exhaust gas containing moisture.

In the embodiment described above, the filter section is located downstream of the superheated steam generating pipe in the flow of the exhaust gas of the exhaust gas treatment device. However, the positional relationship between the filter section and the superheated steam generating pipe is not limited to this. The filter section may be located upstream of the superheated steam generating pipe in the exhaust gas flow of the exhaust gas treatment device.

In the first embodiment, the superheated steam generating pipe is formed of a cylindrical portion and a protruding portion protruding in the radially inward direction. However, the configuration of the superheated steam generating pipe is not limited to this.

In the first embodiment, the cylindrical portion of the superheated steam generating pipe is formed so that the cross-sectional shape perpendicular to the direction in which the exhaust gas flows is annular. However, the cross-sectional shape of the cylindrical portion is not limited to this.

In the first embodiment, four projections of the superheated steam generating pipe are provided, but the number of projections is not limited to this. In the first embodiment, the protrusions are provided at equal intervals, but the arrangement of the protrusions is not limited to this.

A protrusion of the superheated steam generating pipe of the first embodiment may be provided on the inner wall surface of the superheated steam generating pipe of the second embodiment.

In the second embodiment, the heat receiving portion is a substantially cylindrical member provided in the radially outer direction of the spiral superheated steam generating pipe. However, the shape of the heat receiving portion is not limited to this. The heat receiving portion may be provided to be heatable by the heat of the superheated steam generating pipe.

In the third embodiment, it is assumed that the heat source generating furnace burns a fuel to generate a high-temperature gas. The pyrolysis furnace was a rotary kiln. However, the heat source generation furnace and the decomposition furnace are not limited thereto.

In the third embodiment, the pyrolysis system is configured to pyrolyze biomass. However, the subject matter to which the pyrolysis system is pyrolyzed is not limited to this. Industrial waste or the like may be used as long as it contains an organic compound.

The exhaust gas treatment system of the second embodiment may be applied to the third embodiment.

In the embodiment described above, the cylindrical portion and the projecting portion of the superheated steam generating pipe are integrally formed from a metal based on 70% nickel-25% chromium. However, the material forming the cylindrical portion and the protruding portion is not limited to this. It is only necessary to be formed of a material which can generate heat by the flow of an electric current.

In the embodiment described above, the filter section has activated carbon and apatite using Yatropha seed slag as a raw material. However, the configuration of the filter section is not limited to this. Activated carbon alone or apatite alone using Yatropha seed slag as a raw material may also be used. The raw material of the activated carbon is not limited to jatropha seed slag.

In the embodiment described above, the activated carbon adsorbs the sulfur oxide gas as the "predetermined gas". However, the gas adsorbed by the activated carbon is not limited to this.

The present disclosure is not limited to the embodiments described above and can be implemented in various forms without departing from the spirit of the disclosure.

The present disclosure has been described in accordance with the examples. However, the present disclosure is not limited to such embodiments and structures. The present disclosure also encompasses various modifications and variations within the scope of equivalents. Also, various combinations and forms, as well as other combinations and forms including only one element, more, or less, are within the scope and spirit of the present disclosure.

The invention claimed is:
1. An exhaust gas treatment system capable of purifying exhaust gas containing moisture, comprising:
  a superheated steam generating pipe (20, 40) formed of a material capable of generating heat by energization and having a flow path (200, 400) through which an exhaust gas can flow, and making moisture contained in the exhaust gas flowing through the flow path as superheated steam by the heat; and
  a housing (10) which is provided to accommodate the superheated steam generating pipe, is formed to be able to circulate the exhaust gas before being introduced into the flow path and can preheat the exhaust gas by the heat of the superheated steam generating pipe,
  wherein the superheated steam generating pipe is formed in a spiral shape surrounding a space, the exhaust gas before being introduced into the flow path passes through the space.
2. The exhaust gas treatment system according to claim 1, wherein the superheated steam generating pipe has a cylindrical portion (21) which is an outer contour of the flow path, and projecting portions (221, 222, 223, 224) which project radially inward from an inner wall surface (213) of the cylindrical portion.

3. The exhaust gas treatment system according to claim 2, which further comprises a heat receiving section (50) provided outside the superheated steam generating pipe and heatable by the heat of the superheated steam generating pipe, wherein the heat receiving section can preheat the exhaust gas flowing in the housing.

4. The exhaust gas treatment system according to claim 3, further comprising a filter section (30) having at least one of activated carbon (311) capable of adsorbing a predetermined component contained in the exhaust gas and apatite (321) capable of absorbing an acid fume contained in the exhaust gas.

5. The exhaust gas treatment system according to claim 2, further comprising a filter section (30) having at least one of activated carbon (311) capable of adsorbing a predetermined component contained in the exhaust gas and apatite (321) capable of absorbing an acid fume contained in the exhaust gas.

6. The exhaust gas treatment system according to claim 1, which further comprises a heat receiving section (50) provided outside the superheated steam generating pipe and heatable by the heat of the superheated steam generating pipe, wherein the heat receiving section can preheat the exhaust gas flowing in the housing.

7. The exhaust gas treatment system according to claim 6, further comprising a filter section (30) having at least one of activated carbon (311) capable of adsorbing a predetermined component contained in the exhaust gas and apatite (321) capable of absorbing an acid fume contained in the exhaust gas.

8. The exhaust gas treatment system according to claim 1, further comprising a filter section (30) having at least one of activated carbon (311) capable of adsorbing a predetermined component contained in the exhaust gas and apatite (321) capable of absorbing an acid fume contained in the exhaust gas.

* * * * *